United States Patent [19]

Johansson

[11] 4,190,262
[45] Feb. 26, 1980

[54] DEVICE FOR SECURING A LOAD ON A VEHICLE

[76] Inventor: Kurt E. Johansson, Timmermansgatan 12, S-981 00 Kiruna, Sweden

[21] Appl. No.: 902,425

[22] Filed: May 3, 1978

[30] Foreign Application Priority Data

May 10, 1977 [SE] Sweden ................................ 7705404

[51] Int. Cl.² ............................................. B60R 11/00
[52] U.S. Cl. ...................................... 410/37; 248/500; 410/96
[58] Field of Search ....................... 280/179 A, 179 R; 105/473, 477; 248/500, 503

[56] References Cited

U.S. PATENT DOCUMENTS

| | | | |
|---|---|---|---|
| 1,245,607 | 11/1917 | Maxwell | 280/179 A |
| 4,011,974 | 3/1977 | Scarola | 280/179 A |

FOREIGN PATENT DOCUMENTS 305415 10/1968 Sweden.
323895 11/1968 Sweden.

*Primary Examiner*—Robert R. Song
*Attorney, Agent, or Firm*—Frishauf, Holtz, Goodman & Woodward

[57] ABSTRACT

A device for securing a load on a load carrying vehicle comprises a frame attached to the vehicle, an expandible bellows mounted to the frame, at least one end of the bellows being movable relative to the frame, a balance arm pivotally mounted at its center to the movable end of the bellows, tensioning arms connected to the end portions of the balance arm, the tensioning arms being pivotally mounted to the frame at one end thereof, and a plurality of elongated load securing connecting devices connected to the ends of the tensioning arms, whereby when the bellows is expanded, the balance arm and the tension arms are displaced relative to the frame to draw the elongated connecting devices taut to secure the load to the load carrying vehicle.

9 Claims, 5 Drawing Figures

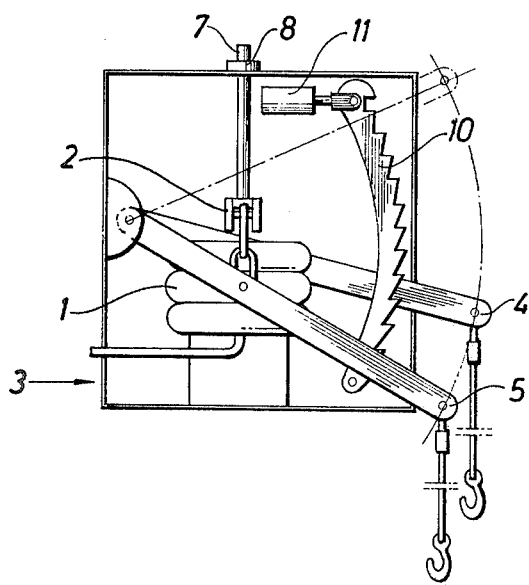
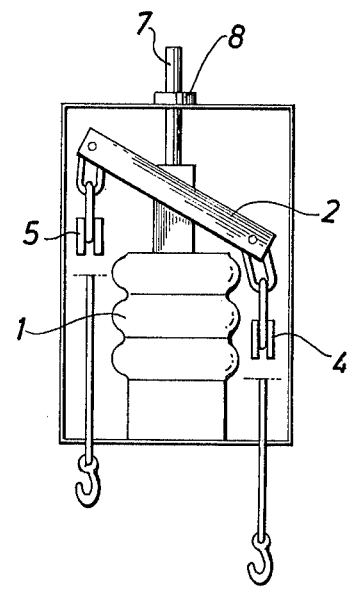
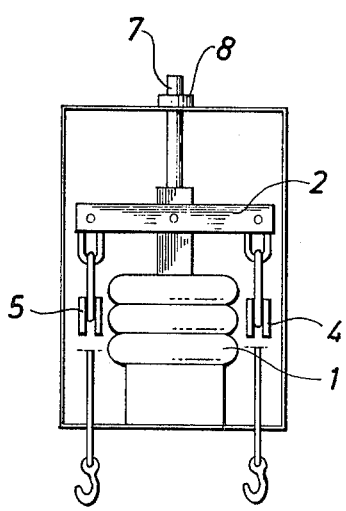
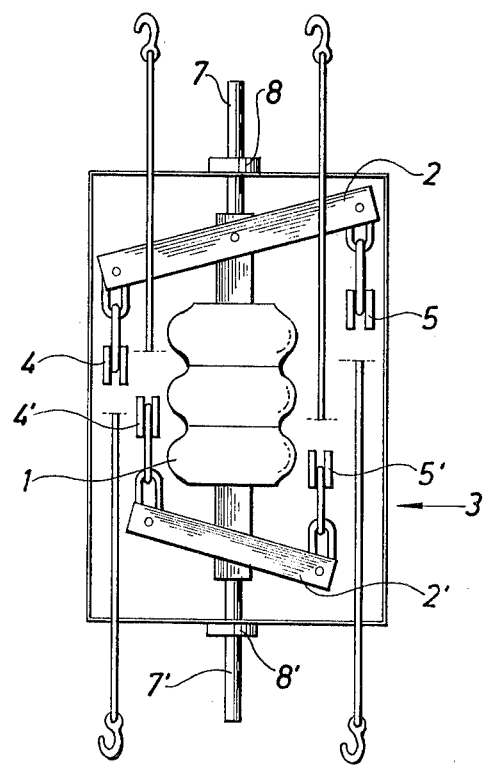

DEVICE FOR SECURING A LOAD ON A VEHICLE

This invention relates to a device for securing a load on a load- carrying vehicle, on which a plurality of chains, wires, ropes or the like are attached to one side of the load or the vehicle and are passed over the load to the other side of the vehicle, relative to which the frame of the device is fixed.

A device for securing a load on a vehicle is known from, for example, Swedish Pat. No. 323,895 and functions admirably. The disavantage of this prior art device is, however, that it is only able to tension one chain, etc.

For conveying timber on a vehicle, the demand currently imposed by road authorities stipulate two bindings for each pile of timber. On a normal timber-carrying rig, with two piles on the tractor and one on the trailer, six devices of the type shown in the aforesaid Swedish patent will thus be required.

Such a large number of devices necessitates not only ample space beneath the tractor and trailer respectively, but also long lines and a large number of valves to regulate the tension of the respective chain. Moreover, the cost for so many devices and their installation will be very high.

the main object of this invention is to provide an improved device of the general type shown in the aforesaid patent enabling at least two chains or the like to be tensioned individually without appreciably increasing the cost of the device or the installation.

SUMMARY OF THE INVENTION

The device according to the present invention is characterized in that one movable end of the bellows or the like is guided by the frame, in that an arm comprises a balance arm actuatable via a joint by the movable end of the bellows or the like, the said balance arm being arranged to actuate via its outer end sections two tensioning arms at a distance from their ends, one end of each tensioning arm being pivotably connected to the frame and the other appropriately loosenably connectable with one of the said chains, or the like.

A particularly interesting embodiment of the invention for tensioning 4 chains, or the like, individually with the aid of a device is characterized in that also the other end of the bellows or the like is guided by the frame and actuates via a joint an additional balance arm which is arranged to actuate via its outer end sections two additional tensioning arms at a distance from their ends, one end of each additional tensioning arm being pivotably connected to the frame and the other appropriately loosenably connectable with another of the said chains, etc.

Particularly appropriate according to the present invention, moreover, is that each tensioning arm is provided with an individual reverse catch which is arranged to prevent the tensioning arm from moving back.

BRIEF DESCRIPTION OF THE DRAWINGS

FIG. 2 shows the same embodiment as in FIG. 1 but in the nontensioned state and in a side view, FIG. 3 shows the same embodiment as in FIG. 1 but seen in a direction which is offset 90° in relation to FIG. 2, FIG. 4 shows the same thing as FIG. 4 but in the tensioned state and FIG. 5 shows a second embodiment of the invention in the tensioned state.

Figure 1:
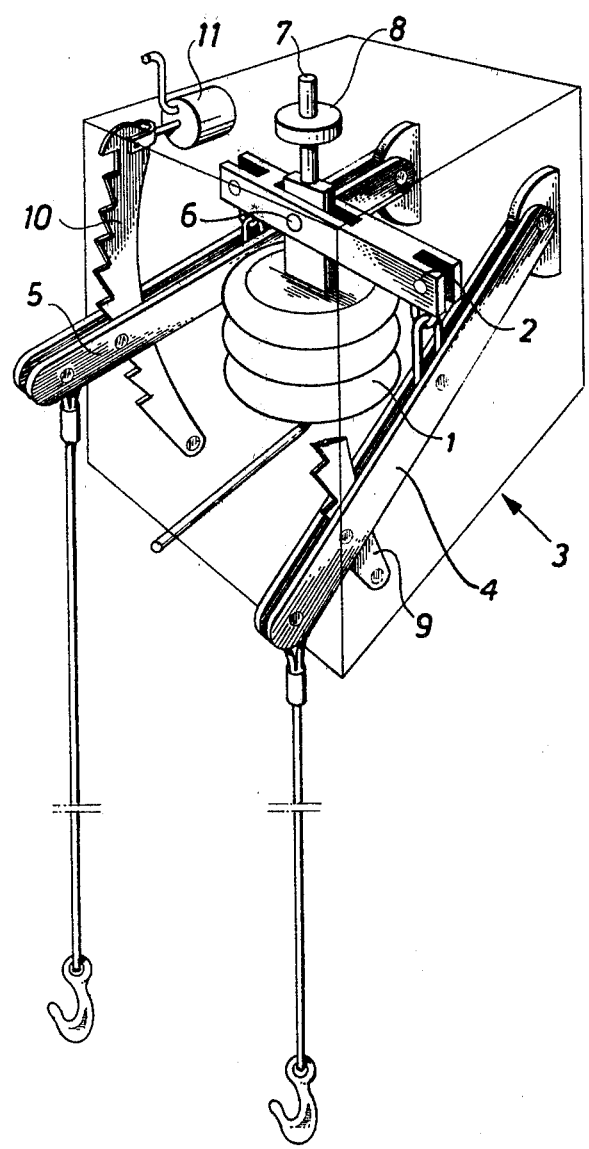
FIG. 1 shows a first embodiment of the invention seen in a perspective view.

In a first embodiment of the invention illustrated in FIGS. 1-4, a frame 3 for a device according to the invention is placed on one side of a vehicle (not shown). Inside the frame 3 a bellows 1 is disposed with one end attached to the frame 3, and the other end connected via a joint 6 with the central point of a balance arm 2. One end of the bellows 1 is guided by a guide pin 7, appropriately running through a hole 8 in the frame 3 in order largely to retain its transverse position when the bellows 1 is expanded. Expansion of the bellows 1 is appropriately provided for through the vehicle's compressed-air system (not shown on the drawings) but can also be arranged by suitable hydraulic means.

In each end section of the balance arm 2, tensioning arms 4 and 5 respectively are pivotably disposed at a distance from their respective ends on either side of the bellows 1. One end of each tensioning arm 4 and 5 respectively is pivotably attached to the frame 3, the other end being arranged for connection to a chain, rope or the like which largely passes over the circumference of the load on the vehicle.

Each tensioning arm 4 and 5 respectively cooperates with an appurtenant reverse catch 9 and 10 respectively which prevents the tensioning arm from moving back if the bellows 1 should lose its feed. The reverse catches 9 and 10 can be released with the aid of the moving piston of respective air cylinders 11 (shown in the drawing only in connection with arm 5)

The stroke of the tensioning arms 4 and 5 has been chosen to be about 50 cm.

Shown in FIG. 1 is the first embodiment with a slightly expanded bellows and in FIG. 2 the same embodiment viewed from the side. FIGS. 3 and 4 respectively show positions corresponding to those shown in FIGS. 1 and 2 but offset 90° in relation to the viewing direction according to FIG. 2 and tensioned.

Shown in FIG. 5 is a second embodiment wherein the expansion of a bellows 1 tensions four chains or the like individually.

In the embodiment of FIG. 5 the end of the bellows 1 which is stationary according to FIGS. 1, 2, 3 and 4 is executed as a movable end guided by a guide pin 7' and a hole defining washer or bearing 8' and is pivotably connected to an additional balance arm 2' which in turn is pivotably connected at its respective ends to two additional tensioning arms 4' and 5' which are attached to the frame 3 in the same manner as the tensioning arms 4' and 5' whose free ends are loosenably connectable to two additional chains or the like. These additional tensioning arms 4' and 5' are also fitted with reverse catches (not shown) to individually lock each tensioning arm in the event of loss of feed to the bellows 1.

The present invention is also applicable to the device shown in Swedish Pat. No. 305,415 and instead of a bellows use may naturally be made of other similarly movable devices, for instance a screw driven by an electric motor.

I claim:

1. A device for securing a load on a load-carrying vehicle comprising:
   a frame (3) attached to said load-carrying vehicle;
   expansion means (1) mounted to said frame (3), said expansion means (1) having at least one expansion member which is movable relative to said frame (3);

a plurality of tensioning arms (4, 5), said tensioning arms each having first and second ends, each of said plurality of tensioning arms being hingedly mounted to said frame (3) substantially near said first ends of said plurality of tensioning arms (4,5);

a plurality of elongated connecting means, each of said elongated connecting means having a terminal end and a free end, each of said terminal ends of said plurality of elongated connecting means being attached to a respective one of said plurality of tensioning arms (4, 5) substantially near said second ends of said plurality of tensioning arms;

at least one balance arm (2) having a central portion and first and second end portions, said central portion being pivotally connected to said at least one expansion member of said expansion means (1), said first and second end portions of said balance arm each being coupled to a respective one of said plurality of tensioning arms (4,5);

whereby after passing said plurality of elongated connecting means over a load on said load-carrying vehicle and securing said free ends of said elongated connecting means to said load carrying vehicle, said expansion means (1) is expanded, thereby displacing said at least one balance arm (2) and said plurality of tensioning arms (4, 5) relative to said frame (3) to draw said plurality of elongated connecting means taut and to secure said load to said load-carrying vehicle.

2. The device of claim 1 wherein said expansion means has first and second ends, one of said first and second ends of said expansion means comprising said expansion member and being movable relative to said frame, and the other end of said expansion means being stationarily fixed to said frame.

3. The device of claim 1 wherein said expansion means has first and second ends, one of which comprises said expansion member, both of said ends thereof being movable relative to said frame.

4. The device of claim 1, 2 or 3 wherein said expansion means comprises a bellows.

5. The device of claim 1 wherein said expansion means has first and second expansion members, both of which are movable relative to said frame (3), said central portion of said balance arm (2) being pivotally connected to said first movable expansion member, further comprising:

a second plurality of tension arms (4', 5') having first and second ends, each of said second plurality of tensioning arms being hingedly mounted to said frame (3) substantially near said first ends of said second plurality of tensioning arms;

a second balance arm (2') having a central portion and first and second ends, said central portion of said second balance arm (2') being pivotally connected to said second movable expansion member of said expansion means (1), said first and second end portions of said second balance arm each being coupled to a respective one of said second plurality of tensioning arms (4', 5'); and a second plurality of elongated connecting means, each of said second plurality of elongated connecting means having a terminal end and a free end, each of said terminal ends of said second plurality of elongated connecting means being attached to a respective one of said second plurality of tensioning arms (4', 5') substantially near said second ends of said second plurality of tensioning arms;

at least one of said balance arms (2, 2') being displaced upon expansion of said expansion means (1).

6. The device of claim 5 wherein said expansion means comprises a bellows.

7. The device of claim 5 or 6 wherein said first and second ends of said expansion means are oppositely displaceable relative to said frame.

8. The device of claim 1 wherein said expansion means has first and second ends, at least one of said first and second ends comprising at least one elongated guide pin member (7), said elongated guide pin member being fixedly attached to said expansion means (1) and extending substantially parallel to the direction of movement of said expansion means relative to said frame (3), said expansion member being at said at least one end ; and said frame (3) further comprises at least one guide aperture (8) positioned in line with and slideably receiving said at least one elongated guide pin member (7).

9. The device of claim 1, 2, 3 or 5 further comprising a plurality of reverse catch means (9,10), each of said reverse catch means being engageable with a respective one of said tensioning arms so that upon expansion of said expansion means (1) and tightening of said elongated connecting means, said reverse catch means engage their respective tensioning arm to prevent reverse movement of said tensioning arm and removal of tension upon said elongated connecting means.

* * * * *